US012609295B2

(12) United States Patent
Shionoya et al.

(10) Patent No.: US 12,609,295 B2
(45) Date of Patent: *Apr. 21, 2026

(54) ELECTRODE FOR SECONDARY BATTERY AND SECONDARY BATTERY

(71) Applicant: TOYOTA JIDOSHA KABUSHIKI KAISHA, Toyota (JP)

(72) Inventors: Haruka Shionoya, Toyota (JP); Katsushi Enokihara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/583,541

(22) Filed: Feb. 21, 2024

(65) Prior Publication Data

US 2024/0194851 A1 Jun. 13, 2024

Related U.S. Application Data

(63) Continuation of application No. 17/943,689, filed on Sep. 13, 2022.

(30) Foreign Application Priority Data

Sep. 21, 2021 (JP) ................................. 2021-153017

(51) Int. Cl.
H01M 4/13 (2010.01)
H01M 4/02 (2006.01)
(Continued)

(52) U.S. Cl.
CPC ........... H01M 4/13 (2013.01); H01M 4/0404 (2013.01); H01M 10/058 (2013.01); H01M 2004/021 (2013.01); H01M 2004/025 (2013.01)

(58) Field of Classification Search
CPC . H01M 4/13; H01M 4/0404; H01M 2004/021
See application file for complete search history.

(56) References Cited

U.S. PATENT DOCUMENTS 6,444,357 B1 * 9/2002 Kambe ................... H01M 4/02
429/169
2003/0082446 A1 5/2003 Chiang et al.
(Continued)

FOREIGN PATENT DOCUMENTS

CN 103682249 A 3/2014
EP 0967672 A1 * 12/1999 .............. H01M 4/04
(Continued)

OTHER PUBLICATIONS

U.S. Appl. No. 17/943,689, filed Sep. 13, 2022 in the name of Haruka Shionoya et al.
(Continued)

*Primary Examiner* — Maria Laios
*Assistant Examiner* — Benjamin T Lustgraaf
(74) *Attorney, Agent, or Firm* — Oliff PLC

(57) ABSTRACT

An electrode for a secondary battery includes a substrate and an active material layer. The active material layer is placed on a surface of the substrate. In a surface of the active material layer, one or more grooves are formed. The groove extends linearly in a direction perpendicular to a thickness direction of the active material layer. The groove has an open portion on a periphery of the active material layer. The open portion opens in the direction perpendicular to the thickness direction. The groove includes a first region and a second region. The second region is interposed between the open portion and the first region. In a cross section perpendicular to a direction in which the groove extends, the first region has a first cross-sectional area, and the second region has a
(Continued)

second cross-sectional area. The second cross-sectional area is smaller than the first cross-sectional area.

7 Claims, 4 Drawing Sheets

(51) Int. Cl.
H01M 4/04 (2006.01)
H01M 10/058 (2010.01)

(56) References Cited

U.S. PATENT DOCUMENTS

| | | | |
|---|---|---|---|
| 2008/0213662 A1 | 9/2008 | Chiang et al. |
| 2011/0064999 A1 | 3/2011 | Chiang et al. |
| 2011/0070489 A1 | 3/2011 | Chiang et al. |
| 2013/0071552 A1 | 3/2013 | Teraki et al. |
| 2014/0342225 A1 | 11/2014 | Isshiki et al. |

| | | | | |
|---|---|---|---|---|
| 2020/0099087 A1 * | 3/2020 | Nakagawa | ............ | H01M 10/04 |
| 2020/0140281 A1 * | 5/2020 | Greulich-Weber | ......................... | |
| | | | | C04B 35/62675 |
| 2020/0185680 A1 | 6/2020 | Kim et al. | | |

FOREIGN PATENT DOCUMENTS

| | | | | | |
|---|---|---|---|---|---|
| JP | 2001-035484 | A | | 2/2001 |
| JP | 2002-015764 | A | | 1/2002 |
| JP | 2011-253820 | A | | 12/2011 |
| JP | 2013-077560 | A | | 4/2013 |
| JP | 2013134894 | A | * | 7/2013 |
| JP | 2021-009846 | A | | 1/2021 |
| KR | 10-2012-0049145 | A | | 5/2012 |

OTHER PUBLICATIONS

Apr. 25, 2025 Non-Final Rejection received in U.S. Appl. No. 17/943,689.
Oct. 10, 2025 Office Action issued in U.S. Appl. No. 17/943,689.
Dec. 30, 2025 Notice of Allowance issued in U.S. Appl. No. 17/943,689.

* cited by examiner

A-A CROSS SECTION

B-B CROSS SECTION

ELECTRODE FOR SECONDARY BATTERY AND SECONDARY BATTERY

This is a Continuation of application Ser. No. 17/943,689 filed Sep. 13, 2022, which claims priority to Japanese Patent Application No. 2021-153017 filed on Sep. 21, 2021, with the Japan Patent Office, the entire contents of which are hereby incorporated by reference.

BACKGROUND

Field

The present disclosure relates to an electrode for a secondary battery and a secondary battery.

Description of the Background Art

Japanese Patent Laying-Open No. 2021-009846 discloses a technique for enhancing electrolytic solution impregnation force and gas discharge force by embodying a patterned adhesive force on a surface of a separation film.

SUMMARY

A "secondary battery" refers to a battery capable of charge and discharge. Hereinafter, a secondary battery may be simply called "a battery". Generally, a battery includes an electrode and an electrolyte solution. The electrode includes an active material layer. The active material layer is porous. The electrolyte solution permeates the active material layer.

When permeation of the electrolyte solution into the active material layer is insufficient, inconvenient phenomena such as a decrease in cycling performance, for example, are expected to occur. To address this problem, a groove (a linear depressed portion) may be formed in a surface of the active material layer, for example. The groove may serve as a channel for an electrolyte solution. Forming the groove is expected to facilitate permeation of the electrolyte solution.

The active material layer expands and shrinks due to charge and discharge. While the active material layer expands, the electrolyte solution is ejected from the active material layer. With a groove formed in the active material layer, ejection of the electrolyte solution may be facilitated. If ejection of the electrolyte solution is facilitated, the electrolyte solution in the active material layer may become exhausted. As a result, cycling performance may decrease, contrary to the original intention.

An object of the present disclosure is to provide an electrode which enables easy permeation of an electrolyte solution but does not enable easy ejection thereof.

Hereinafter, the technical configuration and effects of the present disclosure will be described. It should be noted that the action mechanism according to the present specification includes presumption. The action mechanism does not limit the technical scope of the present disclosure.

1. An electrode for a secondary battery includes a substrate and an active material layer. The active material layer is placed on a surface of the substrate. In a surface of the active material layer, one or more grooves are formed. The groove extends linearly in a direction perpendicular to a thickness direction of the active material layer. The groove has an open portion on a periphery of the active material layer. The open portion opens in the direction perpendicular to the thickness direction.

The groove includes a first region and a second region. The second region is interposed between the open portion and the first region. In a cross section perpendicular to a direction in which the groove extends, the first region has a first cross-sectional area, and the second region has a second cross-sectional area. The second cross-sectional area is smaller than the first cross-sectional area.

The groove extends linearly on a surface of the active material layer. The groove opens at a periphery of the active material layer. The open portion of the groove serves as an inlet/outlet for an electrolyte solution. Hereinafter, the direction in which the groove extends is also called "an extending direction". The cross-sectional area of the groove refers to the area of a cross section perpendicular to the extending direction. Conventionally, the cross-sectional area of the groove does not change. In the present disclosure, the cross-sectional area of the groove does change. That is, the groove includes a first region and a second region. The second region is closer to the open portion (an inlet/outlet) than the first region is. The cross-sectional area of the second region is smaller than the cross-sectional area of the first region. The second region may function as a weir or a check valve.

The groove is a channel for an electrolyte solution. When the electrolyte solution passes through the groove, pressure loss occurs. The groove can be regarded as a pipe to allow for estimating the pressure loss.

FIG. 1 is a view for describing pressure loss.

In the graphs in FIG. 1, the vertical axis represents pressure loss, and the horizontal axis represents the pipe diameter. The pipe diameter may be regarded as the square root of the cross-sectional area of the groove. For the sake of convenience, the square root of the cross-sectional area of the groove may also be called "the groove diameter". The curve in the graph is derived by the Darcy-Weisbach equation "$\Delta P = \lambda L \rho U^2/(2d)$", where "$\Delta P$" represents pressure loss, "$\lambda$" represents the pipe friction factor, "$L$" represents the groove length, "$\rho$" represents the electrolyte solution density, "$U$" represents the average flow speed, and "$d$" represents the groove diameter.

When the active material layer expands, the groove shrinks. The pressure loss during expansion of the active material layer (during shrinkage of the groove) is "$\Delta P_{exp}$". When the active material layer shrinks, the groove enlarges. The pressure loss during shrinkage of the active material layer (during enlargement of the groove) is "$\Delta P_{con}$". "E" is the ratio of the volume of the active material layer during a shrunk period (during a discharged period) to the volume of the active material layer during an expanded period (during a charged period). "$\varepsilon$" may change depending on, for example, the type of an active material. For example, "$\varepsilon = 0.9$" may be satisfied. As the volume of the active material layer changes due to charge and discharge, the pressure loss of the groove also changes. During expansion of the active material layer (during shrinkage of the groove), pressure loss increases. During shrinkage of the active material layer (during enlargement of the groove), pressure loss decreases. The amount of change in pressure loss due to charge and discharge is "$\Delta P_{exp} - \Delta P_{con}$".

When the groove includes a first region and a second region, the pressure loss during expansion of the active material layer (during shrinkage of the groove) is "$\Delta P'_{exp}$", and the pressure loss during shrinkage of the active material layer (during enlargement of the groove) is "$\Delta P'_{con}$". "$\Delta P'_{exp}$" and "$\Delta P'_{con}$" are determined by assigning the length of the first region into "$L_1$", the diameter of the first region into "$d_1$", the average flow speed of the first region into "$U_1$", the length of the second region into "$L_2$", the diameter of the second region into "$d_2$", and the average flow speed of the second region into "$U_2$". In the present disclosure, "$d_2 < d_1$" is satisfied. The amount of change in pressure loss due to charge and discharge is "$\Delta P'_{exp} - \Delta P'_{con}$".

When the second region with a smaller cross-sectional area is present, the amount of change in pressure loss due to charge and discharge, "$\Delta P'_{exp} - \Delta P'_{con}$", may increase significantly. According to a novel finding of the present disclosure, the greater the amount of change in pressure loss due to charge and discharge is, the more inhibited the ejection of the electrolyte solution tends to be during expansion of the active material layer.

Further, during shrinkage of the active material layer, the electrolyte solution may be sucked through the open portion into the active material layer. While the electrolyte solution is being sucked, the presence of the second region with a smaller cross-sectional area may significantly facilitate permeation of the electrolyte solution. It seems to be attributed to capillary action.

As a result of the above actions working synergistically, in the present disclosure, it is possible to provide an electrode which enables easy permeation of an electrolyte solution but does not enable easy ejection thereof.

2. In the cross section perpendicular to a direction in which the groove extends, the first region may have a first depth, and the second region may have a second depth. The second depth may be smaller than the first depth.

For example, the depth of each region may be changed so as to adjust the cross-sectional area of the region.

3. In the cross section perpendicular to a direction in which the groove extends, the first region may have a first width, and the second region may have a second width. The second width may be smaller than the first width.

For example, the width of each region may be changed so as to adjust the cross-sectional area of the region.

4. The groove may include two second regions. The first region may be interposed between the two second regions.

For example, the second region may be connected to both ends of the first region. When the second region is connected to both ends of the first region, nonuniform distribution of the electrolyte solution in a planar direction is expected to be reduced, for example.

5. The second region may be connected to the open portion.

When the second region is directly connected to the inlet/outlet, the function as a weir is expected to be enhanced.

6. The following Expressions 1 to 5 may be satisfied:

$$(\Delta P'_{exp} - \Delta P'_{con})/(\Delta P_{exp} - \Delta P_{con}) > 1 \qquad \text{Expression 1}$$

$$\Delta P_{con} = \mu_1 (L_1 + L_2) U_1^2 / (2d_1) \qquad \text{Expression 2}$$

$$\Delta P_{exp} = \lambda_1 (L_1 + L_2) U_1^2 / (2\varepsilon d_1) \qquad \text{Expression 3}$$

$$\Delta P'_{con} = \lambda_1 L_1 U_1^2 / (2d_1) + \lambda_2 L_2 U_2^2 / (2d_2) \qquad \text{Expression 4}$$

$$\Delta P'_{exp} = \lambda_1 L_1 U_1^2 / (2\varepsilon d_1) + \lambda_2 L_2 U_2^2 / (2\varepsilon d_2) \qquad \text{Expression 5}$$

where
"$\lambda_1$" represents a pipe friction factor in the first region,
"$\lambda_2$" represents a pipe friction factor in the second region,
"$L_1$" represents a length of the first region in the direction in which the groove extends,
"$L_2$" represents a length of the second region in the direction in which the groove extends,
"$U_1$" represents an average flow speed in the first region,
"$U_2$" represents an average flow speed in the second region, "$d_1$" represents a square root of the first cross-sectional area,
"$d_2$" represents a square root of the second cross-sectional area, and
"$\varepsilon$" represents a ratio of a volume of the active material layer during a discharged period to a volume of the active material layer during a charged period.

When the above Expression 1 is satisfied, it is expected that permeation of the electrolyte solution is facilitated and ejection of the electrolyte solution is inhibited.

The above Expressions 2 to 5 are derived by the Darcy-Weisbach equation. Usually, the Darcy-Weisbach equation includes "fluid density ($\rho$)" (see FIG. 1). However, fluid density can be cancelled in the division in the above Expression 1, so in the above Expressions 2 to 5, "fluid density ($\rho$)" is omitted.

7. The following Expression 6 may be further satisfied:

$$(\Delta P'_{exp} - \Delta P'_{con})/(\Delta P_{exp} - \Delta P_{con}) \geq 5.5 \qquad \text{Expression 6}$$

When the above Expression 6 is satisfied, it is expected that permeation of the electrolyte solution is further facilitated and ejection of the electrolyte solution is further inhibited.

8. A secondary battery includes the electrode according to the above items 1 to 7 and an electrolyte solution.

The battery may exhibit an excellent cycling performance, for example. It may be because the electrolyte solution easily permeates into the electrode and the electrolyte solution is not easily ejected from the electrode.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 is a schematic cross-sectional view illustrating a secondary battery according to the present embodiment.

DESCRIPTION OF THE PREFERRED EMBODIMENTS

Figure 1:
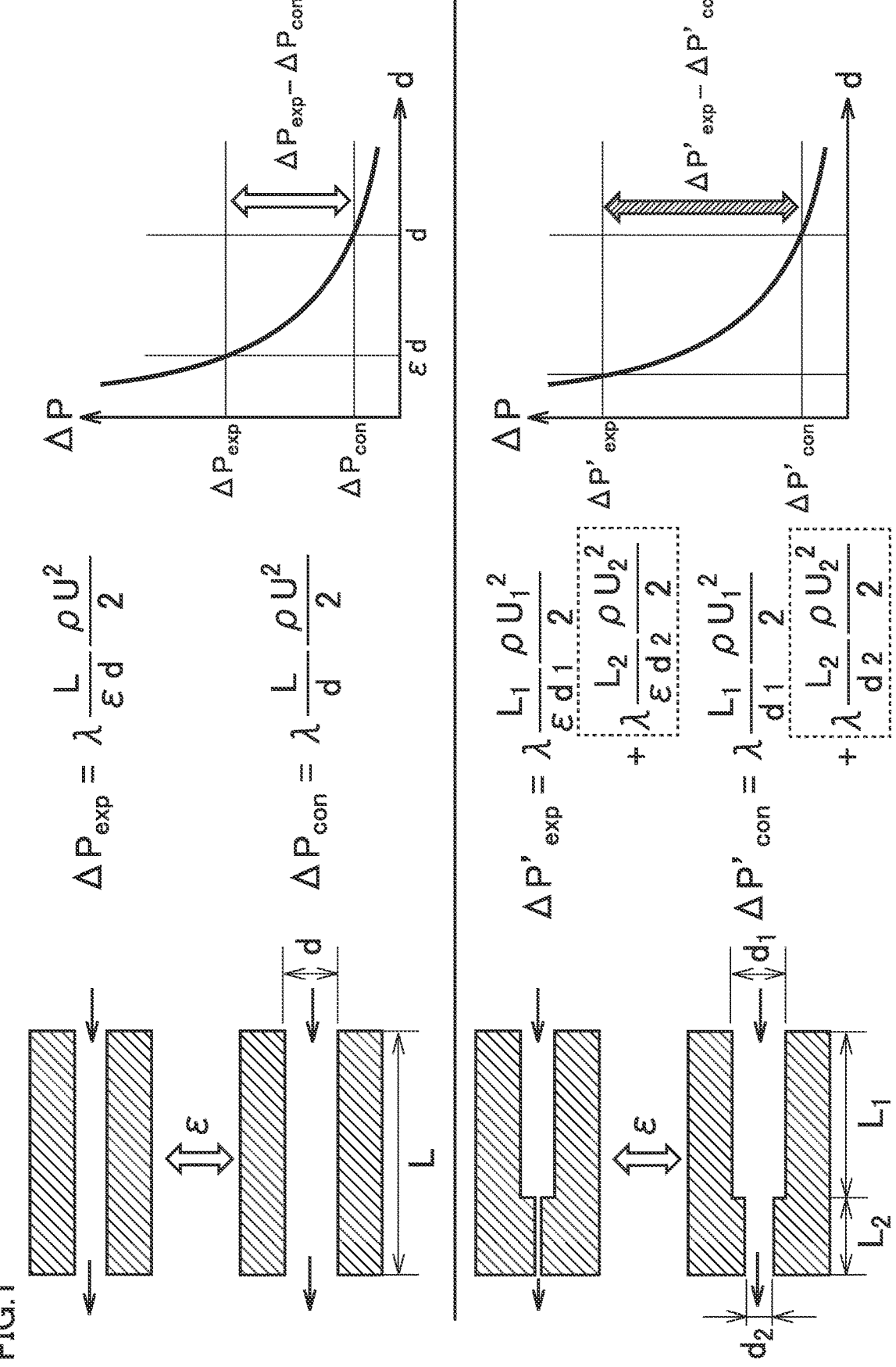
FIG. 1 is a view for describing pressure loss.

Definitions of Terms, Etc.

Next, an embodiment of the present disclosure (which may also be simply called "the present embodiment") and an example of the present disclosure (which may also be simply called "the present example") will be described. It should be noted that neither the present embodiment nor the present example limits the technical scope of the present disclosure.

Herein, expressions such as "comprise", "include", and "have", and other similar expressions (such as "be composed of", for example) are open-ended expressions. In an open-ended expression, in addition to an essential component, an additional component may or may not be further included. The expression "consist of" is a closed-end expression. However, even when a closed-end expression is used, impurities present under ordinary circumstances as well as an additional element irrelevant to the technique according to the present disclosure are not excluded. The expression "consist essentially of" is a semiclosed-end expression. A semiclosed-end expression tolerates addition of an element that does not substantially affect the fundamental, novel features of the technique according to the present disclosure.

Herein, a singular form also includes its plural meaning, unless otherwise specified.

Herein, expressions such as "may" and "can" are not intended to mean "must" (obligation) but rather mean "there is a possibility" (tolerance).

Herein, any geometric term (such as "parallel", "vertical", and "perpendicular", for example) should not be interpreted solely in its exact meaning. For example, "parallel" may mean a geometric state that is deviated, to some extent, from exact "parallel". Any geometric term herein may include tolerances and/or errors in terms of design, operation, production, and/or the like. The dimensional relationship in each figure may not necessarily coincide with the actual dimensional relationship. The dimensional relationship (in length, width, thickness, and the like) in each figure may have been changed for the purpose of assisting the understanding of the technique according to the present disclosure. Further, a part of a configuration may have been omitted.

Herein, a numerical range, such as "from m to n %", for example, includes both the upper limit and the lower limit, unless otherwise specified. That is, "from m to n %" means a numerical range of "not less than m % and not more than n %". "Not less than m % and not more than n %" includes "more than m % and less than n %". Moreover, any numerical value selected from a certain numerical range may be used as a new upper limit or a new lower limit. For example, any numerical value from a certain numerical range may be combined with any numerical value described in another location of the present specification or in a table or a drawing to set a new numerical range.

Herein, all numerical values are regarded as being modified by the term "about". The term "about" may mean±5%, ±3%, ±1%, and/or the like, for example. Each numerical value may be an approximate value that can vary depending on the implementation configuration of the technique according to the present disclosure. Each numerical value may be expressed in significant figures. Each measured value may be the average value obtained from multiple measurements performed. The number of measurements may be 3 or more, or may be 5 or more, or may be 10 or more. Generally, the greater the number of measurements is, the more reliable the average value is expected to be. Each measured value may be rounded off based on the number of the significant figures. Each measured value may include an error occurring due to an identification limit of the measurement apparatus, for example.

Herein, "D50" is defined as a particle size in volume-based particle size distribution at which cumulative frequency of particle sizes accumulated from the small size side reaches 50%. The volume-based particle size distribution may be obtained by measurement with a laser-diffraction particle size distribution analyzer.

Herein, when a compound is represented by a stoichiometric composition formula such as "$LiCoO_2$", for example, this stoichiometric composition formula is merely a typical example. Alternatively, the composition ratio may be non-stoichiometric. For example, when lithium cobalt oxide is represented as "$LiCoO_2$", the composition ratio of lithium cobalt oxide is not limited to "Li/Co/O=1/1/2" but Li, Co, and O may be included in any composition ratio, unless otherwise specified. Further, doping with a trace element and/or substitution may also be tolerated.

In the present specification, "a lithium-ion battery" is described. However, a lithium-ion battery is merely an example of a secondary battery. The present embodiment may be applied to any secondary battery.

"SOC (state of charge)" herein refers to the percentage of the charged capacity of an electrode at a point in time in question relative to the full charge capacity of the electrode.

<Electrode for Secondary Battery>

Figure 2:
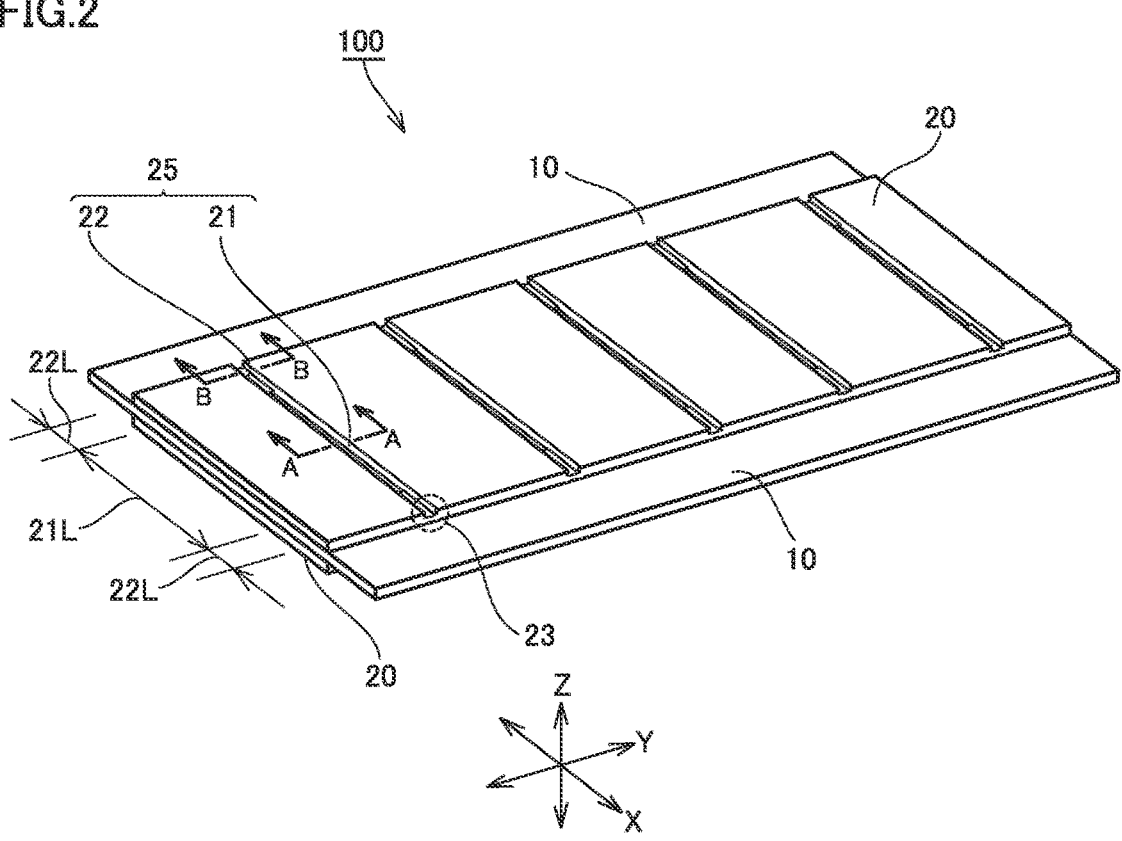
FIG. 2 is a schematic view illustrating an electrode according to the present embodiment.

FIG. 2 is a schematic view illustrating an electrode according to the present embodiment.

An electrode 100 is for a secondary battery. The secondary battery is described below. Electrode 100 may be a positive electrode, or may be a negative electrode, or may be a bipolar electrode. Electrode 100 is in sheet form. Electrode 100 includes a substrate 10 and an active material layer 20.

<<Substrate>>

Substrate 10 is a support for active material layer 20. Substrate 10 may be in sheet form, or may be in mesh form, for example. Substrate 10 may have a belt-like planar shape, for example. Substrate 10 may be electrically conductive. The substrate may function as a current collector. Part of substrate 10 may be exposed from active material layer 20. To the exposed part of substrate 10, a current-collecting member and/or the like may be bonded, for example.

Substrate 10 may have any thickness. Substrate 10 may have a thickness from 5 to 50 μm, or may have a thickness from 5 to 20 μm, for example.

Substrate 10 may include a metal foil and/or the like, for example. Substrate 10 may include at least one selected from the group consisting of an aluminum (Al) foil, an Al alloy foil, a copper (Cu) foil, a Cu alloy foil, a nickel (Ni) foil, a Ni alloy foil, a titanium (Ti) foil, and a Ti alloy foil, for example. When electrode 100 is a positive electrode, substrate 10 may include an Al foil and/or the like, for example. When electrode 100 is a negative electrode, substrate 10 may include a Cu foil and/or the like, for example.

<<Active Material Layer>>

Active material layer 20 is placed on a surface of substrate 10. Active material layer 20 may be placed on only one side, or on both sides, of substrate 10. Active material layer 20 may have any thickness. Active material layer 20 may have a thickness from 5 to 1000 μm, or may have a thickness from 10 to 500 μm, or may have a thickness from 50 to 250 μm, for example.

<Groove>

In a surface of active material layer 20, one or more grooves 25 (depressed portions) are formed. Groove 25 may be formed by embossing and/or the like, for example. A single groove 25 may be formed, or a plurality of grooves 25 may be formed. The plurality of grooves 25 may be formed as parallel lines, or may be formed in a grid pattern, for example. The "parallel lines" refer to a group of lines that are parallel to each other. When a plurality of grooves 25 are formed, the pitch (the interval) between adjacent grooves 25 may be from 0.1 to 10 mm, for example. Groove 25 may have a length from 1 to 5000 mm, or may have a length from 1 to 1000 mm, for example.

Groove 25 extends in a direction perpendicular to a thickness direction of active material layer 20 (namely, to the Z-axis direction). The extending direction (the X-axis direction) in FIG. 2 is an example thereof. As long as it is perpendicular to the thickness direction, the extending direction may be not limited. Groove 25 extends linearly. Groove 25 may be a straight line, or may be bent, or may be curved, or may be wavy, for example. Groove 25 may be an unbranched line, or may be a branched line. A plurality of grooves 25 may merge together.

Groove 25 may run across the surface of active material layer 20, for example. Groove 25 has an open portion 23 on a periphery of active material layer 20. Open portion 23 opens in the direction perpendicular to the thickness direction (in the X-axis direction in FIG. 2). In other words, groove 25 opens in a side wall of active material layer 20. The side wall of active material layer 20 may be inclined. Open portion 23 may serve as an inlet/outlet for an electrolyte solution. Groove 25 may have a plurality of open portions 23. For example, a single groove 25 may branch into multiple grooves to form a plurality of open portions 23.

Groove 25 includes a first region 21 and a second region 22. First region 21 may also be called "a main groove portion", "a central portion", and/or the like, for example. Second region 22 may also be called "a narrow portion", "a sub-groove portion", "an end portion", and/or the like, for example. First region 21 is connected to second region 22. Second region 22 is interposed between open portion 23 and first region 21. Second region 22 may be provided on only one side of first region 21, or may be provided on both sides of first region 21. In other words, groove 25 may include two second regions 22. First region 21 may be interposed between two second regions 22. When second regions 22 are connected to both ends of first region 21, nonuniform distribution of the electrolyte solution in a planar direction of active material layer 20 is expected to be reduced, for example. Second region 22 may be connected to open portion 23. Second region 22 may be located apart from open portion 23.

First region 21 has a first length 21L. Second region 22 has a second length 22L. Second length 22L may be shorter than first length 21L. For example, the ratio of second length 22L to first length 21L may be from 0.01 to 0.5, or may be from 0.05 to 0.5, or may be from 0.1 to 0.3, for example.

Figure 3:
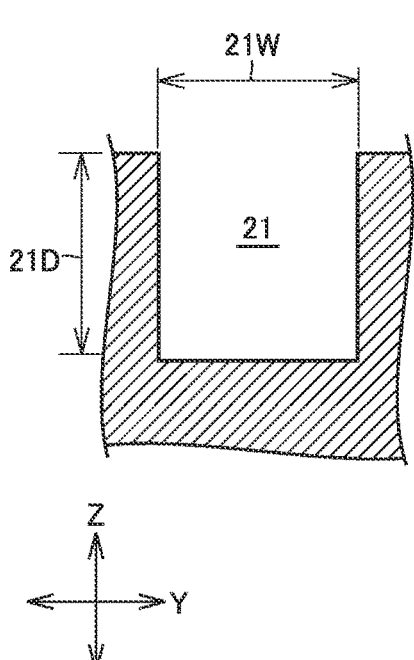
FIG. 3 is schematic cross-sectional views of an example of a first region and an example of a second region.
Figure 3:
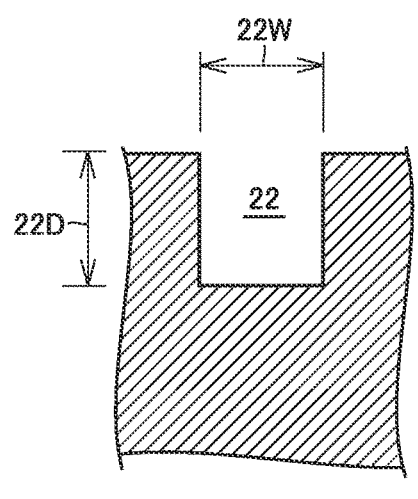

FIG. 3 is schematic cross-sectional views of an example of a first region and an example of a second region.

Illustrated in FIG. 3 are the A-A cross section in FIG. 2 and the B-B cross section in FIG. 2. Each cross section is perpendicular to the extending direction of groove 25. First region 21 and second region 22, independently, may have any cross-sectional profile. The bottom face of each of these regions may be flat. The bottom face of each of these regions may be not flat. A side wall of each of these regions may be perpendicular to the surface of active material layer 20. A side wall of each of these regions may be inclined. The cross-sectional profile of each of these regions may be rectangular, or may be U-shaped, or may be V-shaped, for example.

First region 21 has a first cross-sectional area. Second region 22 has a second cross-sectional area. The second cross-sectional area is smaller than the first cross-sectional area. Thus, second region 22 is capable of functioning as a weir for the electrolyte solution. For example, the ratio of the second cross-sectional area to the first cross-sectional area may be from 0.1 to 0.9, or may be from 0.3 to 0.7.

As long as one or more grooves 25 each including first region 21 and second region 22 are formed in the surface of active material layer 20, one or more other grooves having a uniform cross-sectional area (not illustrated), for example, may be further formed in the surface of active material layer 20.

As for respective regions, its cross-sectional area may not change, or may change. For example, within first region 21, the depth of groove 25 may continuously change in a slope manner. For example, within second region 22, the width of groove 25 may continuously change in a tapered manner.

For example, there may be a difference in level between first region 21 and second region 22. In other words, the cross-sectional area of groove 25 may change stepwise between first region 21 and second region 22.

For example, there may be no difference in level between first region 21 and second region 22. In other words, the cross-sectional area of groove 25 may change continuously between first region 21 and second region 22. For example, in the XY plane in FIG. 2, groove 25 may extend in a tapered shape. In other words, groove 25 may become narrower toward open portion 23. Alternatively, in the XZ plane in FIG. 2, groove 25 may extend in a tapered shape. In other words, groove 25 may become shallower toward open portion 23. In the present embodiment, even when there is no difference in level, it is considered that first region 21 having the first cross-sectional area and second region 22 having the second cross-sectional area are present.

First region 21 may have a first depth 21D. Second region 22 may have a second depth 22D. Second depth 22D may be smaller than first depth 21D. The ratio of second depth 22D to first depth 21D may be from 0.1 to 0.9, or may be from 0.3 to 0.7, for example. First depth 21D may be from 10 to 400 μm, or may be from 50 to 300 μm, or may be from 50 to 200 μm, or may be from 50 to 150 μm, for example. When the depth is not uniform in the target region, the depth at the deepest point is regarded as the depth of the target region.

First region 21 may have a first width 21W. Second region 22 may have a second width 22W. Second width 22W may be smaller than first width 21W. The ratio of second width 22W to first width 21W may be from 0.1 to 0.9, or may be from 0.3 to 0.7, for example. First width 21W may be from 10 to 500 μm, or may be from 50 to 300 μm, or may be from 50 to 200 μm, or may be from 50 to 150 μm, for example. The width is perpendicular to the depth. When the width is not uniform in the target region, the largest width of the target region is regarded as the width of the target region.

<Pressure Loss>

Regarding electrode 100, the following Expressions 1 to 5 may be satisfied:

$$(\Delta P'_{exp} - \Delta P'_{con})/(\Delta P_{exp} - \Delta P_{con}) > 1 \qquad \text{Expression 1}$$

$$\Delta P_{con} = \lambda_1 (L_1 + L_2) U_1{}^2/(2d_1) \qquad \text{Expression 2}$$

$$\Delta P_{exp} = \lambda_1 (L_1 + L_2) U_1{}^2/(2\varepsilon d_1) \qquad \text{Expression 3}$$

$$\Delta P'_{con} = \lambda_1 L_1 U_1{}^2/(2d_1) + \lambda_2 L_2 U_2{}^2/(2d_2) \qquad \text{Expression 4}$$

$$\Delta P'_{exp} = \lambda_1 L_1 U_1{}^2/(2\varepsilon d_1) + \lambda_2 L_2 U_2{}^2/(2\varepsilon d_2) \qquad \text{Expression 5}$$

where

"$\lambda_1$" represents a pipe friction factor in first region 21,

"$\lambda_2$" represents a pipe friction factor in second region 22,

"$L_1$" represents a length of first region 21 in the extending direction,

"$L_2$" represents a length of second region 22 in the extending direction,

"$U_1$" represents an average flow speed in first region 21,

"$U_2$" represents an average flow speed in second region 22,

"$d_1$" represents a square root of the first cross-sectional area,

"$d_2$" represents a square root of the second cross-sectional area, and

"$\varepsilon$" represents a ratio of a volume of active material layer 20 during a discharged period (during a shrunk period) to a volume of active material layer 20 during a charged period (during an expanded period).

In the above Expressions 1 to 5, each of "$\Delta P_{con}$, $\Delta P_{exp}$, $\Delta P'_{con}$, $\Delta P'_{exp}$" represents pressure loss. In the above Expression 1, "$\Delta P_{exp}-\Delta P_{con}$" represents the amount of change in pressure loss due to charge and discharge on the assumption that groove 25 consists of first region 21. In the above Expression 1, "$\Delta P'_{exp}-\Delta P'_{con}$" represents the amount of change in pressure loss due to charge and discharge when groove 25 includes first region 21 and second region 22. When the left side of the above Expression 1 is greater than 1, it is expected that permeation of the electrolyte solution is facilitated and ejection of the electrolyte solution is inhibited. The greater the left side of the above Expression 1 is, the more facilitated the permeation of the electrolyte solution may be and the more inhibited the ejection of the electrolyte solution may be. For example, the following Expression 6 may be satisfied.

$$(\Delta P'_{exp}-\Delta P'_{con})/(\Delta P_{exp}-\Delta P_{con})\geq 5.5 \qquad \text{Expression 6}$$

The left side of Expression 6 may be 6.4 or more, or may be 19 or more, for example. The left side of Expression 6 may be from 5.5 to 19, or may be from 6.4 to 19, or may be from 5.5 to 6.4, for example.

"$d_1$" may be first depth 21D, or may be first width 21W, for example. "$d_2$" may be second depth 22D, or may be second width 22W, for example.

"During a charged period" refers to a fully charged state (SOC=100%). "During a discharged period" refers to a fully discharged state (SOC=0%). "$\varepsilon$" may be from 0.2 to 0.99, for example. "F" may vary depending on the type of an active material, and/or the like. For example, when the active material includes graphite, "$\varepsilon$-=0.7 to 0.9" may be satisfied. For example, when the active material includes silicon, "$\varepsilon$=0.25 to 0.9" may be satisfied. For example, when the active material includes silicon oxide, "$\varepsilon$=0.5 to 0.9" may be satisfied. For example, when the active material includes a positive electrode active material, "$\varepsilon$=0.9 to 0.99" may be satisfied.

"$U_1$" and "$U_2$" may be derived by the following Expressions 7, 8:

$$U_1=(\Delta P_{los}+\Delta P_{cap})d_1^2/(32\ \mu L_1) \qquad \text{Expression 7}$$

$$U_2=(\Delta P_{los}+\Delta P_{cap})d_2^2/(32\ \mu L_2) \qquad \text{Expression 8}$$

where

"$\mu$" represents the coefficient of viscosity,

"$\Delta P_{los}$" represents straight pipe pressure loss, and

"$\Delta P_{cap}$" represents capillary action pressure.

"$\Delta P_{cap}$" may be derived by the following Expression 9:

$$\Delta P_{cap}=4\sigma\cos\theta/d \qquad \text{Expression 9}$$

where

"$d_1$" or "$d_2$" may be assigned into "$d$",

"$\sigma$" represents surface tension, and

"$\theta$" represents contact angle.

"$\lambda_1$" and "$\lambda_2$" may be derived by the following Expressions 10, 11;

$$\lambda_1=64\mu/(U_1 d_1\rho) \qquad \text{Expression 10}$$

$$\lambda_2=64\mu/(U_2 d_2\rho) \qquad \text{Expression 11}$$

where

"$\rho$" represents the density of the electrolyte solution.

<Composition>

Active material layer 20 includes an active material. In addition to the active material, active material layer 20 may further include a binder, a conductive material, and/or the like. For example, active material layer 20 may be formed by applying a slurry to a surface of substrate 10 in a layered manner. For example, active material layer 20 may be formed by shaping a wet powdery and granular material into a sheet form.

The active material may be in particle form, for example. The active material may have a D50 from 1 to 30 μm, for example. The active material may include a positive electrode active material, for example. The positive electrode active material is capable of occluding and releasing lithium ions at an electric potential higher than that of the negative electrode active material. The positive electrode active material may include an optional component. The positive electrode active material may include, for example, at least one selected from the group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. "(NiCoMn)" in "$Li(NiCoMn)O_2$", for example, means that the constituents within the parentheses are collectively regarded as a single unit in the entire composition ratio. As long as (NiCoMn) is collectively regarded as a single unit in the entire composition ratio, the amounts of individual constituents are not particularly limited. $Li(NiCoMn)O_2$ may include $Li(Ni_{1/3}Co_{1/3}Mn_{1/3})O_2$, $Li(Ni_{0.5}Co_{0.2}Mn_{0.3})O_2$, $Li(Ni_{0.8}Co_{0.1}Mn_{0.1})O_2$, and/or the like, for example.

The active material may include a negative electrode active material, for example. The negative electrode active material is capable of occluding and releasing lithium ions at an electric potential lower than that of the positive electrode active material. The negative electrode active material may include an optional component. The negative electrode active material may include, for example, at least one selected from the group consisting of graphite, soft carbon, hard carbon, silicon, silicon oxide, silicon-based alloy, tin, tin oxide, tin-based alloy, and $Li_4Ti_5O_{12}$.

The conductive material is capable of forming an electron conduction path. The amount of the conductive material to be used may be, for example, from 0.1 to 10 parts by mass relative to 100 parts by mass of the active material. The conductive material may include an optional component. The conductive material may include, for example, at least one selected from the group consisting of carbon black, vapor grown carbon fiber, carbon nanotube, and graphene flake.

The binder is capable of bonding the solid materials to each other. The amount of the binder to be used may be, for example, from 0.1 to 10 parts by mass relative to 100 parts by mass of the active material. The binder may include an optional component. The binder may include, for example, at least one selected from the group consisting of polyvinylidene difluoride (PVDF), polytetrafluoroethylene (PTFE), vinylidene difluoride-hexafluoropropylene copolymer (PVDF-HFP), styrene-butadiene rubber (SBR), carboxymethylcellulose (CMC), polyimide (PI), polyamideimide (PAI), and polyacrylic acid (PAA).

<Secondary Battery>

Figure 4:
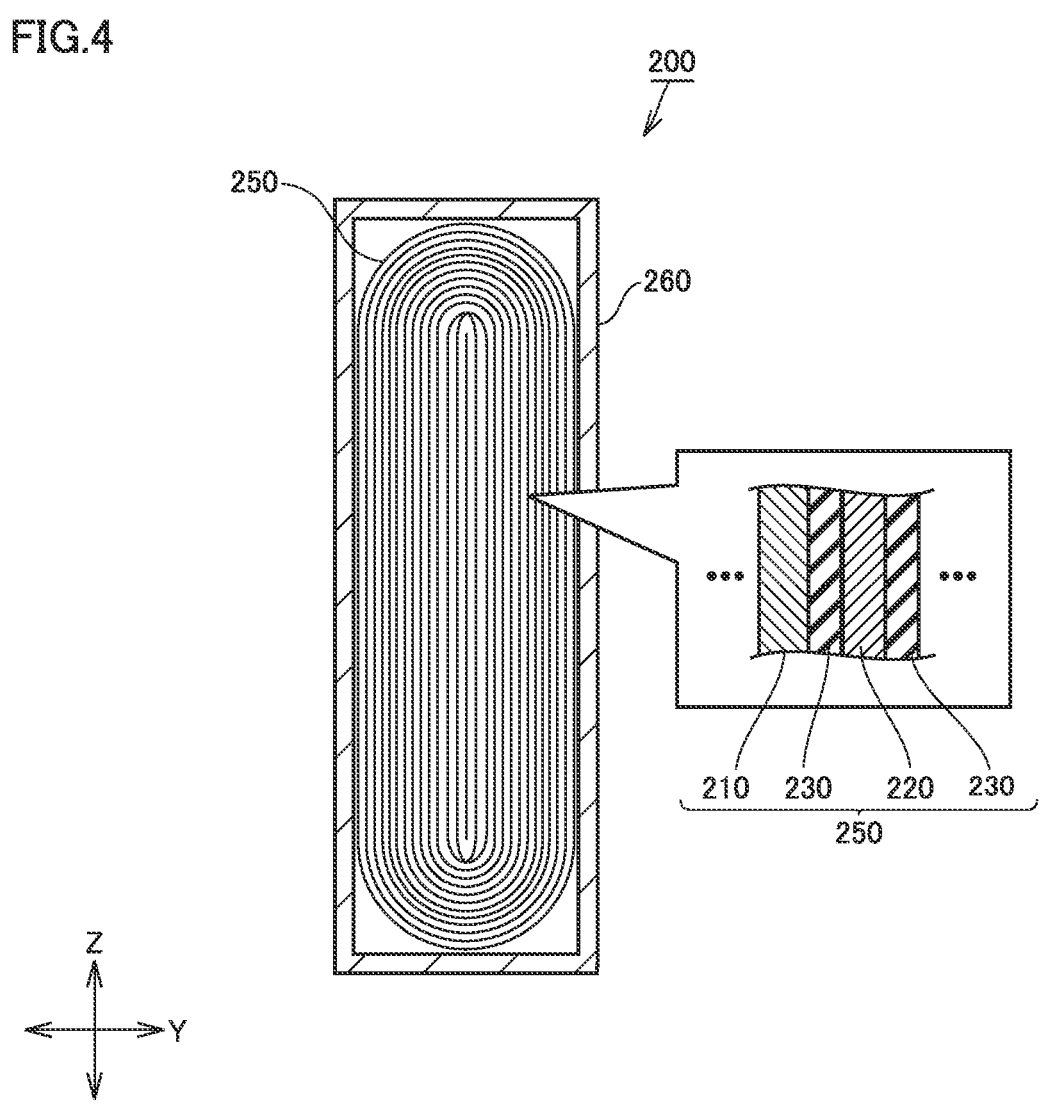

FIG. 4 is a schematic cross-sectional view illustrating a secondary battery according to the present embodiment.

A battery 200 includes a casing 260. Casing 260 may be hermetically sealed. Casing 260 may have any form. Casing 260 may be a pouch made of a metal-foil-laminated film, and/or the like, for example. Casing 260 may be a metal vessel and/or the like, for example. Casing 260 may be prismatic, or may be cylindrical, for example. Casing 260 may include Al and/or the like, for example.

Casing 260 includes an electrode group 250 and an electrolyte solution (not illustrated). The electrolyte solution permeates electrode group 250. Part of the electrolyte solution may remain in the bottom of casing 260. Electrode group 250 may have any form. In FIG. 4, a wound-type electrode group 250 is illustrated as an example. Electrode group 250 may be a stack-type one, for example. Electrode group 250 includes a positive electrode 210 and a negative electrode 220. Electrode group 250 may further include a separator 230. At least one of positive electrode 210 and negative electrode 220 is the above-described electrode 100. That is, battery 200 includes electrode 100 and the electrolyte solution.

Separator 230 may be interposed between positive electrode 210 and negative electrode 220. Separator 230 is electrically insulating. Separator 230 is porous. Separator 230 may be made of polyolefin and/or the like, for example.

The electrolyte solution is a liquid electrolyte. The electrolyte solution may have a density from 500 to 2000 kg/cm³, for example. The electrolyte solution includes a lithium salt and a solvent. The electrolyte solution may further include an optional additive. The lithium salt is dissolved in the solvent. The lithium salt may include, for example, at least one selected from the group consisting of $LiPF_6$, $LiBF_4$, and $Li(FSO_2)_2N$. The concentration of the according to Nos. 1-1, 2-1 does not include a second region. The groove according to Nos. 1-1, 2-1 consists of a first region. That is, the groove according to Nos. 1-1, 2-1 has a uniform cross-sectional area. The groove according to Nos. 1-2, 2-2, 2-3 includes a first region and a second region. The cross-sectional area of the second region is smaller than that of the first region. In the present example, the cross-sectional area of each region was adjusted by changing the width of the region.

The dimensions and the like of each region are given in Table 1 below. Nos. 1-1, 2-1 do not include a second region, but for the sake of convenience, cells for "Second region Length" and the like are filled with numerical values. For the sake of convenience, cells for "Second region Width" and the like for Nos. 1-1, 2-1 are filled with the same numerical values as for the first region.

<Evaluation>

An electrolyte solution was prepared. The density (p) of the electrolyte solution was 1300 kg/m³. The test electrode was subjected to an electrolyte solution permeation test. Time required for permeation of the electrolyte solution (permeation time) was divided by the number of grooves, and thereby permeation time per groove was determined.

TABLE 1

| | | | No. 1-1 | No. 1-2 | No. 2-1 | No. 2-2 | No. 2-3 |
|---|---|---|---|---|---|---|---|
| First region | Length | $L_1$ (mm) | 8 | 8 | 320 | 320 | 320 |
| Second region | Length | $L_2$ (mm) | 2 | 2 | 80 | 80 | 80 |
| First region | Width | $d_1$ (μm) | 100 | 100 | 100 | 100 | 100 |
| Second region | Width | $d_2$ (μm) | 100 | 50 | 100 | 50 | 50 |
| First region | Friction coefficient | $\lambda_1$ (—) | 1.23 | 1.23 | 1.23 | 1.23 | 1.23 |
| Second region | Friction coefficient | $\lambda_2$ (—) | 1.23 | 2.45 | 1.23 | 2.45 | 2.45 |
| First region | Average flow speed | $U_1$ (m/s) | $4.02*10^{-3}$ | $5.02*10^{-3}$ | $1.00*10^{-4}$ | $1.26*10^{-4}$ | $1.26*10^{-4}$ |
| Second region | Average flow speed | $U_2$ (m/s) | $4.02*10^{-3}$ | $1.00*10^{-2}$ | $1.00*10^{-4}$ | $2.51*10^{-4}$ | $5.02*10^{-4}$ |
| $\Delta P_{con} = \lambda_1(L_1 + L_2)\rho U_1^2/(2d_1)$ | | (Pa) | −1.29 | −1.29 | −0.032 | −0.032 | −0.032 |
| $\Delta P_{exp} = \lambda_1(L_1 + L_2)\rho U_1^2/(2\,\varepsilon\,d_1)$ | | (Pa) | −1.43 | −1.43 | −0.036 | −0.036 | −0.036 |
| $\Delta P'_{con} = \lambda_1 L_1 \rho U_1^2/(2d_1) + \lambda_2 L_2 \rho U_2^2/(2d_2)$ | | (Pa) | −1.29 | −8.03 | −0.032 | −0.200 | −0.683 |
| $\Delta P'_{exp} = \lambda_1 L_1 \rho U_1^2/(2\,\varepsilon\,d_1) + \lambda_2 L_2 \rho U_2^2/(2\,\varepsilon\,d_2)$ | | (Pa) | −1.43 | −8.92 | −0.036 | −2.222 | −0.759 |
| $(\Delta P'_{exp} − \Delta P'_{con})/(\Delta P_{exp} − \Delta P_{con})$ | | (—) | 1 | 6.4 | 1 | 5.5 | 19 |
| Electrolyte solution permeation test (Permeation time per groove) | | (s) | 2.49 | 1.79 | 4000 | 2858 | 2698 |

$\varepsilon = 0.9$
$\rho = 1300$ kg/m³ lithium salt may be from 0.5 to 2 mol/L, for example. The solvent may include an optional component. The solvent may include, for example, at least one selected from the group consisting of ethylene carbonate (EC), propylene carbonate (PC), butylene carbonate (BC), ethyl methyl carbonate (EMC), dimethyl carbonate (DMC), and diethyl carbonate (DEC). The additive may include, for example, at least one selected from the group consisting of vinylene carbonate (VC), vinylethylene carbonate (VEC), 1,3-propane sultone (PS), cyclohexylbenzene (CHB), tert-amylbenzene (TAB), and lithium bis(oxalato)borate (LiBOB).

EXAMPLES

Next, the present example is described.
<Producing Test Electrodes>

Test electrodes Nos. 1-1, 1-2, 2-1, 2-2, 2-3 were produced (see Table 1 below). Each test electrode was a negative electrode. Each test electrode included an active material layer. The active material included graphite. "ε" was 0.9.

Figure 5:
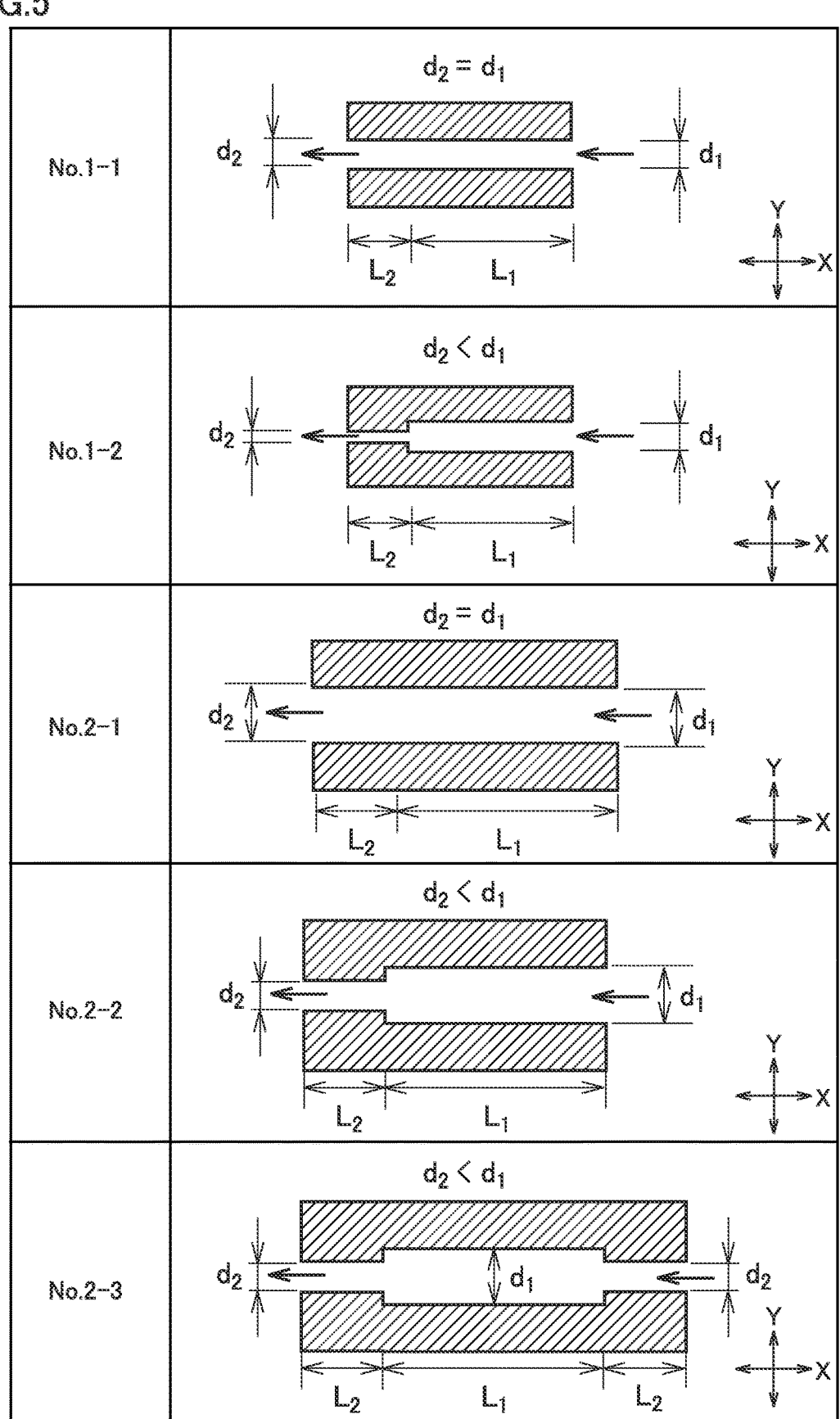
FIG. 5 presents top views of a groove of test electrodes.

FIG. 5 presents top views of a groove of the test electrodes.

In the surface of the active material layer, a plurality of grooves as illustrated in FIG. 5 were formed. The groove <Results>

A test electrode with a second region (No. 1-2) required less permeation time than a test electrode without a second region (No. 1-1). It seems that the second region facilitated permeation of the electrolyte solution.

A test electrode with a second region (Nos. 2-2, 2-3) required less permeation time than a test electrode without a second region (No. 2-1). It seems that the second region facilitated permeation of the electrolyte solution.

The greater the value "$(\Delta P'_{exp}−\Delta P'_{con})/(\Delta P_{exp}−\Delta P_{con})$" is, the more reduced the permeation time tends to be.

The present embodiment and the present example are illustrative in any respect. The present embodiment and the present example are non-restrictive. The technical scope of the present disclosure encompasses any modifications within the meaning and the scope equivalent to the terms of the claims. For example, it is expected that certain configurations of the present embodiments and the present examples can be optionally combined.

What is claimed is:

1. An electrode for a lithium-ion battery, comprising:
a substrate; and
an active material layer, wherein:

the active material layer is placed on a surface of the substrate, one or more grooves are formed in a surface of the active material layer, the groove extends linearly in a direction perpendicular to a thickness direction of the active material layer, the groove has an open portion on a periphery of the active material layer, the open portion opens in the direction perpendicular to the thickness direction, the groove, which extends linearly from the open portion to another open portion on an another periphery of the active material layer, includes a first region and a second region, the first region is a single continuous region on the groove, the second region is interposed between the open portion and the first region, in a cross section perpendicular to a direction in which the groove extends, the first region has a first cross-sectional area and has a first depth, the second region has a second cross-sectional area and has a second depth, the second cross-sectional area is smaller than the first cross-sectional area, and the second depth is smaller than the first depth, and the electrode is a bipolar electrode.

2. The electrode for a lithium-ion battery according to claim 1, wherein in the cross section perpendicular to a direction in which the groove extends, the first region has a first width, the second region has a second width, and the second width is smaller than the first width.

3. The electrode for a lithium-ion battery according to claim 1, wherein the groove includes another second region interposed between the another open portion and the first region, and the first region is interposed between the second region and the another second region.

4. The electrode for a lithium-ion battery according to claim 1, wherein the second region is connected to the open portion.

5. The electrode for a lithium-ion battery according to claim 1, wherein the following Expressions 1 to 5 are satisfied:

$$(\Delta P'_{exp}-\Delta P'_{con})/(\Delta P_{exp}-\Delta P_{con})>1 \qquad \text{Expression 1}$$

$$\Delta P_{con}=\mu_1(L_1+L_2)U_1^2/(2d_1) \qquad \text{Expression 2}$$

$$\Delta P_{exp}=\lambda_1(L_1+L_2)U_1^2/(2\varepsilon d_1) \qquad \text{Expression 3}$$

$$\Delta P'_{con}=\lambda_1 L_1 U_1^2/(2d_1)+\lambda_2 L_2 U_2^2/(2d_2) \qquad \text{Expression 4}$$

$$\Delta P'_{exp}=\lambda_1 L_1 U_1^2/(2\varepsilon d_1)+\lambda_2 L_2 U_2^2/(2\varepsilon d_2) \qquad \text{Expression 5}$$

where $\Delta P_{con}$ represents a pressure loss during shrinkage of the active material layer, $\Delta P_{exp}$ represents a pressure loss during expansion of the active material layer, $\Delta P'_{con}$ represents a pressure loss during shrinkage of the active material layer when the groove includes the first region and the second region, $\Delta P'_{exp}$ represents a pressure loss during expansion of the active material layer when the groove includes the first region and the second region, $\lambda_1$ represents a pipe friction factor in the first region, $\lambda_2$ represents a pipe friction factor in the second region, $L_1$ represents a length of the first region in the direction in which the groove extends, groove extends, $U_1$ represents an average flow speed in the first region, $U_2$ represents an average flow speed in the second region, $d_1$ represents a square root of the first cross-sectional area, $d_2$ represents a square root of the second cross-sectional area, and $\varepsilon$ represents a ratio of a volume of the active material layer during a discharged period to a volume of the active material layer during a charged period.

6. The electrode for a lithium-ion battery according to claim 5, wherein the following Expression 6 is further satisfied:

$$(\Delta P'_{exp}-\Delta P'_{con})/(\Delta P_{exp}-\Delta P_{con})\geq 5.5 \qquad \text{Expression 6.}$$

7. A lithium-ion battery comprising:

an electrode for a secondary battery according to claim 1; and an electrolyte solution.

\* \* \* \* \*